United States Patent [19]

Hansen et al.

[11] Patent Number: 4,473,376

[45] Date of Patent: Sep. 25, 1984

[54] DYE MIXTURES OF AZO COMPOUNDS SOLUBLE IN ORGANIC SOLVENTS

[75] Inventors: Guenter Hansen, Ludwigshafen; Franz Merger, Frankenthal; Gerhard Nestler, Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 101,167

[22] Filed: Dec. 7, 1979

[30] Foreign Application Priority Data

Dec. 7, 1978 [DE] Fed. Rep. of Germany ....... 2852863

[51] Int. Cl.[3] ........................ C09B 31/06; C10L 1/10; C10L 1/14

[52] U.S. Cl. ........................................... 8/639; 8/521; 44/59; 208/12; 260/191; 260/205

[58] Field of Search .................... 260/191, 197; 44/59; 208/12; 8/521, 639

[56] References Cited

U.S. PATENT DOCUMENTS

| | | | |
|---|---|---|---|
| 1,986,116 | 1/1935 | Payne | 260/191 |
| 3,004,821 | 10/1961 | Gano | 260/191 X |
| 3,056,642 | 10/1962 | Kesler et al. | 260/191 X |
| 3,356,443 | 12/1967 | Dziomba | 260/191 X |
| 3,494,714 | 2/1970 | Litke | 260/191 X |
| 3,690,809 | 9/1972 | Orelup | 44/59 X |
| 3,704,106 | 11/1972 | Orelup | 44/59 |
| 4,082,501 | 4/1978 | Mees et al. | 44/59 X |
| 4,210,414 | 7/1980 | Hansen et al. | 260/191 X |

FOREIGN PATENT DOCUMENTS

| | | | |
|---|---|---|---|
| 2387269 | 11/1978 | France | 260/191 |
| 47-31925 | 8/1972 | Japan | 260/191 |
| 48-16152 | 5/1973 | Japan | 260/191 |

*Primary Examiner*—Floyd D. Higel
*Attorney, Agent, or Firm*—Oblon, Fisher, Spivak, McClelland & Maier

[57] ABSTRACT

A mixture, soluble in organic solvents, of compounds of the formula

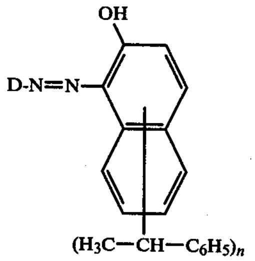

where D is a radical of the formula

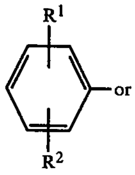

or

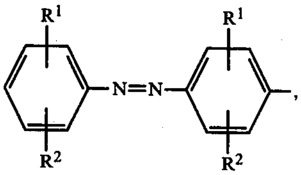

, n is 0, 1, 2 or 3 and $R^1$ and $R^2$ independently of one another are hydrogen, $C_1$-$C_4$-alkyl, methoxy or ethoxy; with the proviso that the mixture contains compounds with n=0, 1 and 2 and, optionally, 3; is disclosed as being exceptionally suitable for dyeing petroleum products, waxes and greases.

1 Claim, No Drawings

DYE MIXTURES OF AZO COMPOUNDS SOLUBLE IN ORGANIC SOLVENTS

The present invention relates to a mixture of compounds of the general formula I

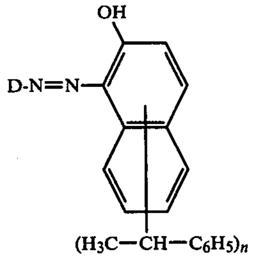

where D is a radical of the formula

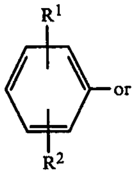
or
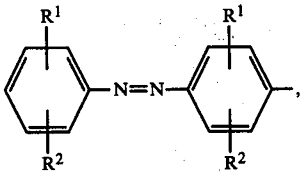
, n is one of the numbers 0, 1, 2 or 3 and $R^1$ and $R^2$ independently of one another are hydrogen, $C_1$–$C_4$-alkyl, methoxy or ethoxy with the proviso that the mixture contains compounds with n=0, 1 and 2 and, optionally, 3.

Examples of alkyl radicals $R^1$ and $R^2$ are butyl, propyl, ethyl and especially methyl.

A mixture of compounds of the formula I may be prepared by reacting diazonium compounds of amines or amine mixtures of the formula $D—NH_2$ with a coupling component mixture of the formula II

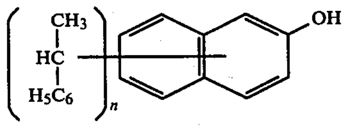

by conventional methods.

The coupling component mixture is obtained by reacting $\beta$-naphthol with styrene using an acid catalyst, for example sulfuric acid.

The mixtures of the compounds of the formula I are distinguished by excellent solubility in organic solvents, especially hydrocarbons. Specific examples of hydrocarbons are benzene, toluene, xylenes, white spirit, ethylbenzene and the products known under the trademark Shellsol.

Because of their solubility characteristics, the compounds of the formula I are exceptionally suitable for the preparation of stock solutions for dyeing mineral oils, especially fuel oil, as well as waxes and greases.

Dye mixtures of particular importance are those of the formula

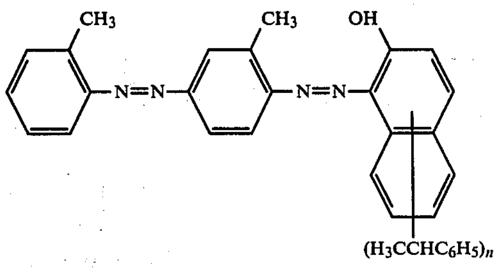
, where n has the stated meaning. Preferred mixtures have, for example, the following composition:

| |
|---|
| 1-10% = n = 0 |
| 20-50% = n = 1 |
| 30-50% = n = 2 |
| 0-10% = n = 3 |

Japanese Published Application No. 31,925/72 has already disclosed a dye of the formula

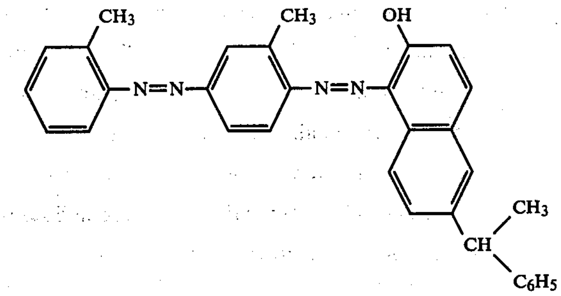

but this dye is insufficiently soluble in hydrocarbons.

In the Examples which follow, parts and percentages are by weight, unless stated otherwise.

EXAMPLE 1

22.5 parts of 4-amino-3,2'-dimethyl-azobenzene, in a mixture of 175 parts of water and 30 parts of 10N hydrochloric acid, are stirred overnight at room temperature, and after adding 100 parts of ice, a concentrated aqueous solution of 6.9 parts of sodium nitrite is introduced. The diazotization is complete in the course of from 3 to 4 hours at from 0° to 5° C.; thereafter the excess nitrite is removed with amidosulfonic acid in the conventional manner. A solution of 28.5 parts of a coupling component mixture in 100 parts of xylene is then added dropwise to the diazonium salt suspension at from 10° to 15° C., whilst stirring vigorously. The coupling is complete after stirring overnight at room temperature. After having neutralized the organic phase by repeated washing with water, the aqueous phase is separated off and the xylene is distilled from the dye solution, leaving 59 parts of a tarry red dye of the formula

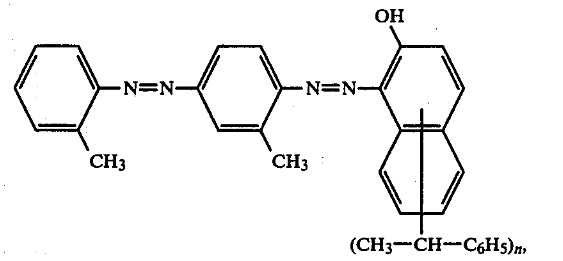

This dye is miscible in all proportions with aromatics and aliphatics and is very suitable for dyeing motor fuels, fuel oils, surface coatings, waxes and greases.

The coupling component mixture is obtained as follows: 156 parts of styrene are added in the course of 30 minutes to a mixture of 144 parts of β-naphthol and 1 part of concentrated sulfuric acid at 120° C., whilst stirring, and the mixture is then stirred for a further 2 hours at 120° C. After working up, a mixture having the following composition, determined by gas chromatography, is obtained: 7.6% of β-naphthol, 37.5% of mono-(α-phenylethyl)-β-naphthol, 53% of bis-(α-phenylethyl)-β-naphthol, remainder unidentified compounds.

The dye mixtures listed in the Table below can be prepared by a method similar to that described in Example 1, and have similar tinctorial characteristics.

| Example | Diazo component | Coupling component | Hue in xylene |
|---|---|---|---|
| 2 | 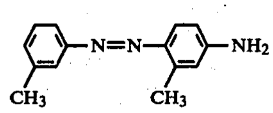 | 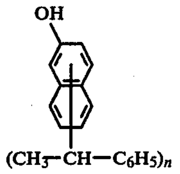 | red |
| 3 | 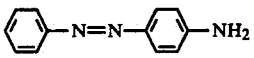 | " | " |

-continued

| Example | Diazo component | Coupling component | Hue in xylene |
|---|---|---|---|
| 4 | 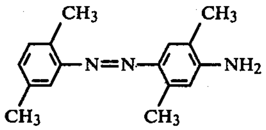 | " | " |
| 5 | 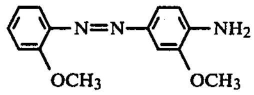 | " | " |
| 6 | 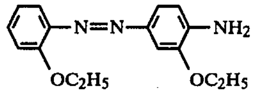 | " | " |
| 7 | 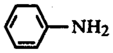 | " | orange |
| 8 | 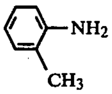 | " | orange |
| 9 | 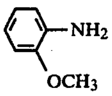 | " | orange |
| 10 | 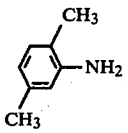 | " | orange |

We claim:

1. A mixture, soluble in organic solvents, of compounds of the formula

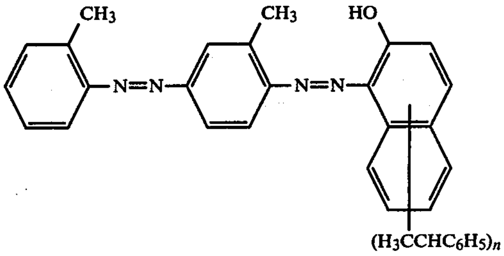

where n is 0, 1, 2 or 3; with the proviso that the mixture contains compounds with n=0, 1 and 2 and, optionally, 3.

* * * * *